(12) United States Patent
Ellis

(10) Patent No.: US 12,066,170 B2
(45) Date of Patent: Aug. 20, 2024

(54) ELECTRICAL MEDALLION

(71) Applicant: Allan Ellis, San Marcos, CA (US)

(72) Inventor: Allan Ellis, San Marcos, CA (US)

(*) Notice: Subject to any disclaimer, the term of this patent is extended or adjusted under 35 U.S.C. 154(b) by 0 days.

(21) Appl. No.: 17/849,604

(22) Filed: Jun. 25, 2022

(65) Prior Publication Data

US 2023/0417398 A1  Dec. 28, 2023

(51) Int. Cl.
*F21V 21/03* (2006.01)
*F21V 25/10* (2006.01)

(52) U.S. Cl.
CPC .............. *F21V 21/03* (2013.01); *F21V 25/10* (2013.01)

(58) Field of Classification Search
CPC .......... F21V 21/02; F21V 21/03; F21V 21/04; H02G 3/20; Y10S 248/906; E04B 9/006
See application file for complete search history.

(56) References Cited

U.S. PATENT DOCUMENTS

| | | | | |
|---|---|---|---|---|
| 4,896,145 A * | 1/1990 | Lewkowicz | ........... | G08B 17/00 340/693.11 |
| 7,374,317 B2 * | 5/2008 | Prazoff | ................... | F21V 23/00 174/67 |
| 9,762,056 B1 * | 9/2017 | Miller | ................... | H01R 25/003 |
| 10,916,905 B2 * | 2/2021 | Chavez | ................... | H01R 33/06 |
| 2007/0275594 A1 * | 11/2007 | Greenberg | ............. | H01R 27/02 439/501 |
| 2010/0078190 A1 * | 4/2010 | Leopold | ................. | H02G 3/088 174/50.52 |
| 2010/0178190 A1 * | 7/2010 | Colombo | ................. | F04C 2/084 418/161 |
| 2018/0335185 A1 * | 11/2018 | Boulanger | ................ | F21L 4/08 |
| 2019/0109427 A1 * | 4/2019 | Chavez | ............... | F21V 23/0464 |
| 2023/0138590 A1 * | 5/2023 | Johnson | ................... | H02G 3/20 174/50 |

* cited by examiner

*Primary Examiner* — Zheng Song
(74) *Attorney, Agent, or Firm* — The Iwashko Law Firm, PLLC; Lev Ivan Gabriel Iwashko

(57) ABSTRACT

An electrical medallion removably connected to at least a portion of an external surface, the electrical medallion including a main body constructed as a ceiling medallion, a plurality of electrical outlets disposed within at least a portion of the main body to receive an electrical plug therein, and a GFI circuit disposed within at least a portion of the main body to automatically isolate and disable at least one of the plurality of electrical outlets in response to detecting an electric current is unbalanced.

3 Claims, 3 Drawing Sheets

ELECTRICAL MEDALLION

BACKGROUND

1. Field

The present general inventive concept relates generally to a ceiling medallion, and particularly, to an electrical medallion.

2. Description of the Related Art

In some buildings, such as homes, it can be difficult to find a source of power for additional lighting. Moreover, in older homes the availability of exterior electrical outlets is limited.

A ceiling medallion is a decorative element disposed on a ceiling to improve aesthetics in a room. Typically, they surround a hole where a lighting element is installed, such as a chandelier. As such, the conventional ceiling medallion has no other utility while installed in the ceiling.

Therefore, there is a need for an electrical medallion that provides electrical connectivity options for electrical devices.

SUMMARY

The present general inventive concept provides an electrical medallion.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electrical medallion removably connected to at least a portion of an external surface, the electrical medallion including a main body constructed as a ceiling medallion, a plurality of electrical outlets disposed within at least a portion of the main body to receive an electrical plug therein, and a GFI circuit disposed within at least a portion of the main body to automatically isolate and disable at least one of the plurality of electrical outlets in response to detecting an electric current is unbalanced.

The electrical medallion may further include a GFI reset switch movably disposed on at least a portion of the main body to allow the plurality of electrical outlets to receive the electric current in response to being switched off.

The electrical medallion may further include a control circuit disposed on at least a portion of the main body to control movement of the electric current to at least one of the plurality of electrical outlets in response to movement of a control switch.

The electrical medallion may further include a plurality of wires disposed within at least a portion of the main body and connected to the plurality of electrical outlets to connect to an external power source to receive power therefrom and send the power to the plurality of electrical outlets.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Electrical Medallion 100
Main Body 110
Center Aperture 111
Electrical Outlets 120

Ground Fault Interrupter (GFI) Circuit 130
GFI Reset Switch 140
Control Circuit 150
Control Switch 160
Lid 170
Lid Aperture 171
Wires 180

Figure 1:
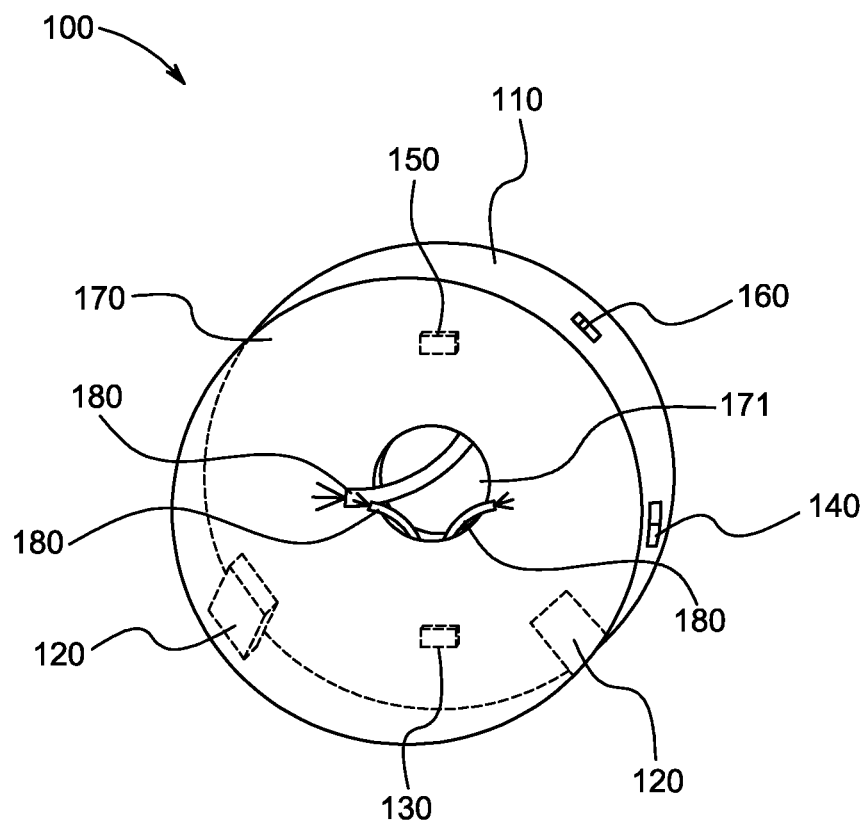
FIG. 1 illustrates a rear perspective view of an electrical medallion, according to an exemplary embodiment of the present general inventive concept.

FIG. 1 illustrates a rear perspective view of an electrical medallion 100, according to an exemplary embodiment of the present general inventive concept.

Figure 2:
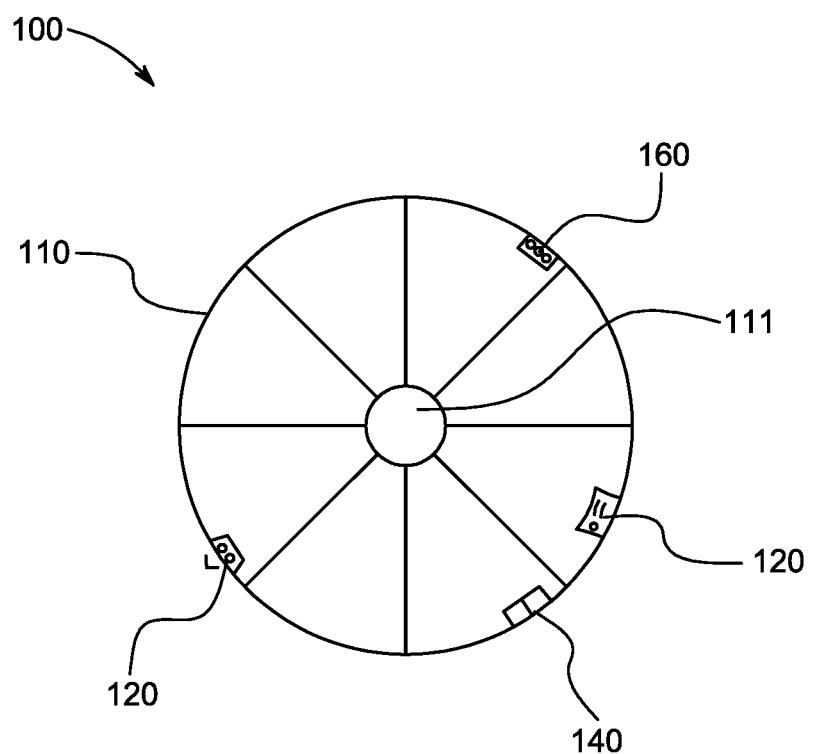
FIG. 2 illustrates an elevational front view of the electrical medallion, according to an exemplary embodiment of the present general inventive concept.

FIG. 2 illustrates an elevational front view of the electrical medallion 100, according to an exemplary embodiment of the present general inventive concept.

Figure 3:
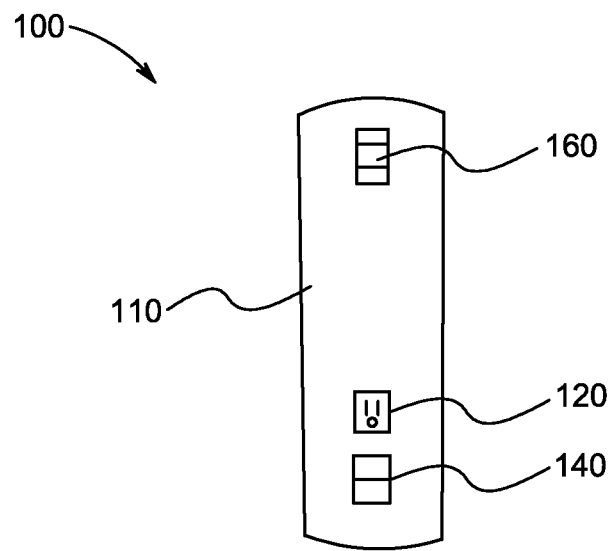
FIG. 3 illustrates a side perspective bottom view of the electrical medallion, according to an exemplary embodiment of the present general inventive concept.

FIG. 3 illustrates a side perspective bottom view of the electrical medallion 100, according to an exemplary embodiment of the present general inventive concept.

The electrical medallion 100 may be constructed from at least one of metal, plastic, wood, and rubber, etc., but is not limited thereto.

The electrical medallion 100 may include a main body 110, a plurality of electrical outlets 120, a ground fault interrupter (GFI) circuit 130, a GFI reset switch 140, a control circuit 150, a control switch 160, a lid 170, and a plurality of wires 180, but is not limited thereto.

Referring to FIGS. 1 through 3, the main body 110 is illustrated to have a cylindrical shape. However, the main body 110 may be rectangular, circular, triangular, pentagonal, hexagonal, heptagonal, octagonal, or any other shape known to one of ordinary skill in the art, but is not limited thereto.

The main body 110 may be removably connected to at least a portion of an external surface (e.g., a wall, a ceiling, etc.). For example, the main body 110 may be connected using a fastener, such as a screw, a nail, a bolt, a washer, a nut, a clamp, a clasp, a magnet, and/or any combination thereof. Moreover, the main body 110 may be similar to a ceiling medallion and have a particular aesthetic based on a preference of a user.

The main body 110 may include a center aperture 111, but is not limited thereto.

The center aperture 111 may be disposed at a center of the main body 110. The center aperture 111 may receive at least one item therethrough, such as at least one wire and at least one rod (e.g., ceiling mounting rod for a light).

Each of the plurality of electrical outlets 120 may include a two-aperture outlet, a three-aperture outlet, a four-aperture outlet, a five-aperture outlet, and a six-aperture outlet, but is not limited thereto.

The plurality of electrical outlets 120 may be disposed on and/or within at least a portion of the main body 110. Each of the plurality of electrical outlets 120 may receive an electrical plug therein to provide power while the electrical plug is connected therein.

The GFI circuit 130 may be disposed within at least a portion of the main body 110 and/or connected to each of the plurality of electrical outlets 120. The GFI circuit 130 may automatically isolate at least one of the plurality of electrical outlets 120 in response to detecting an electric current is unbalanced, such that the GFI circuit 130 may disable at least one of the plurality of electrical outlets 120 to prevent a fire, overheating, and/or damage to wiring.

The GFI reset switch 140 may be movably (i.e., pivotally, slidably) disposed on at least a portion of the main body 110 and/or connected to the GFI circuit 130. The GFI reset switch 140 may automatically move from off in a first position to on in a second position in response to the GFI circuit 130 disabling at least one of the plurality of electrical outlets 120. Conversely, the GFI reset switch 140 may move from on in the second position to off in the first position in response to an application of force (e.g., pushing, pulling) thereto. As such, the GFI reset switch 140 may move to off to reset the GFI circuit 130 and allow the plurality of electrical outlets 120 to receive the electric current.

The control circuit 150 may be disposed on at least a portion of the main body 110 and/or connected to the plurality of electrical outlets 120. The control circuit 150 may control movement of the electric current to at least one of the plurality of electrical outlets 120. In other words, the control circuit 150 may allow the electric current to move to a first of the electrical outlets 120, a second of the electrical outlets 120, all of the electrical outlets 120, and/or none of the electrical outlets 120.

The control switch 160 may be movably (e.g., pivotally, slidably) disposed on at least a portion of the main body 110 and/or connected to the control circuit 150. The control switch 160 may move the control circuit 150 in a first lateral direction or a second lateral direction opposite with respect to the first lateral direction. Additionally, the control switch 160 may control movement of the electric current via the control circuit 150 based on a position of the control switch 160.

The lid 170 may include a lid aperture 171, but is not limited thereto.

The lid 170 may be removably connected to at least a portion of the main body 110. More specifically, the lid 170 may cover an interior of the main body 110 while disposed on the main body 110. Conversely, the lid 170 may facilitate access within the main body 110 while removed from the main body 110.

The lid aperture 171 may be disposed on at least a portion of a center of the lid 170. Moreover, the lid aperture 171 may facilitate access through the lid 170.

The plurality of wires 180 may be disposed within at least a portion of the main body 110 and/or connected to the plurality of electrical outlets 120, the GFI circuit 130, and/or the control circuit 150. The plurality of wires 180 may connect to an exterior wiring unit. For example, the plurality of wires 180 may connect to the exterior wiring unit and/or an external power source (e.g., porch light) to receive power therefrom. Accordingly, the plurality of wires 180 may send power received from the external power source to the plurality of electrical outlets 120.

Therefore, the electrical medallion 100 may increase electrical connectivity options for electrical devices, such as a Christmas lights, power tools, and a barbecue grill. Also, the electrical medallion 100 may provide an appealing aesthetic while offering functional utility.

The present general inventive concept may include an electrical medallion 100 removably connected to at least a portion of an external surface, the electrical medallion 100 including a main body 110 constructed as a ceiling medallion, a plurality of electrical outlets 120 disposed within at least a portion of the main body 110 to receive an electrical plug therein, and a GFI circuit 130 disposed within at least a portion of the main body 110 to automatically isolate and disable at least one of the plurality of electrical outlets 120 in response to detecting an electric current is unbalanced.

The electrical medallion 100 may further include a GFI reset switch 140 movably disposed on at least a portion of the main body 110 to allow the plurality of electrical outlets 120 to receive the electric current in response to being switched off.

The electrical medallion 100 may further include a control circuit 150 disposed on at least a portion of the main body 110 to control movement of the electric current to at least one of the plurality of electrical outlets 120 in response to movement of a control switch 160.

The electrical medallion 100 may further include a plurality of wires 180 disposed within at least a portion of the main body 110 and connected to the plurality of electrical outlets 120 to connect to an external power source to receive power therefrom and send the power to the plurality of electrical outlets 120.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An electrical medallion removably connected to at least a portion of an external surface, the electrical medallion comprising:
 a main body constructed as a ceiling medallion;
 a plurality of electrical outlets disposed within at least a portion of the main body to receive an electrical plug therein;
 a GFI circuit disposed within at least a portion of the main body to automatically isolate and disable at least one of the plurality of electrical outlets in response to detecting an electric current is unbalanced, and;
 a GFI reset switch movably disposed on at least a portion of the main body to allow the plurality of electrical outlets to receive the electric current in response to being switched off, and accessible through an aperture in a lid covering the plurality of electrical outlets.

2. The electrical medallion of claim 1, further comprising:
 a control circuit disposed on at least a portion of the main body to control movement of the electric current to at least one of the plurality of electrical outlets in response to movement of a control switch.

3. The electrical medallion of claim 1, further comprising:
 a plurality of wires disposed within at least a portion of the main body and connected to the plurality of electrical outlets to connect to an external power source to receive power therefrom and send the power to the plurality of electrical outlets.

\* \* \* \* \*